(12) United States Patent
Jones et al.

(10) Patent No.: US 7,979,086 B1
(45) Date of Patent: Jul. 12, 2011

(54) VIRTUAL VISITOR LOCATION REGISTER FOR A WIRELESS LOCAL AREA NETWORK

(75) Inventors: Bryce A. Jones, Overland Park, KS (US); Jason R. Delker, Olathe, KS (US); John M. Everson, Parker, CO (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 12/794,873

(22) Filed: Jun. 7, 2010

Related U.S. Application Data (63) Continuation of application No. 10/644,513, filed on Aug. 20, 2003, now Pat. No. 7,805,161, which is a continuation-in-part of application No. 10/161,497, filed on Jun. 3, 2002, now Pat. No. 7,356,001.

(51) Int. Cl.
*H04M 1/00* (2006.01)

(52) U.S. Cl. .................. 455/555; 455/432.1; 455/435.1

(58) Field of Classification Search .............. 455/426.1, 455/426.2, 432.1, 435.1, 452.1, 462, 465, 455/552.1, 554.1, 555
See application file for complete search history.

(56) References Cited

U.S. PATENT DOCUMENTS

| | | | |
|---|---|---|---|
| 5,583,916 A | 12/1996 | Maenpaa | |
| 5,734,699 A | 3/1998 | Lu et al. | |
| 5,761,620 A | 6/1998 | Furuya et al. | |
| 5,890,064 A | 3/1999 | Widergen et al. | |
| 5,956,652 A | 9/1999 | Eriksson | |
| 5,978,672 A | 11/1999 | Hartmaier et al. | |
| 5,999,813 A | 12/1999 | Lu et al. | |
| 6,169,797 B1 | 1/2001 | Wildgrube et al. | |
| 6,181,935 B1 | 1/2001 | Gossman et al. | |
| 6,212,395 B1 | 4/2001 | Lu et al. | |
| 6,226,515 B1 | 5/2001 | Pauli et al. | |
| 6,243,581 B1 | 6/2001 | Jawanda | |
| 6,301,474 B1 | 10/2001 | Hartmaier et al. | |
| 6,317,594 B1 | 11/2001 | Gossman et al. | |
| 6,330,448 B1 | 12/2001 | Otsuka et al. | |
| 6,363,065 B1 | 3/2002 | Thornton et al. | |
| 6,408,184 B1 | 6/2002 | Kallio et al. | |
| 6,430,395 B2 | 8/2002 | Arazi et al. | |
| 6,446,127 B1 | 9/2002 | Schuster et al. | |
| 6,539,237 B1 | 3/2003 | Sayers et al. | |
| 6,680,923 B1 | 1/2004 | Leon | |
| 6,694,134 B1 | 2/2004 | Lu et al. | |
| 6,901,270 B1 | 5/2005 | Beach | |
| 6,958,931 B1 | 10/2005 | Yoon et al. | |
| 6,970,719 B1 | 11/2005 | McConnell et al. | |
| 7,039,027 B2 * | 5/2006 | Bridgelall ..................... | 370/329 |
| 7,162,020 B1 * | 1/2007 | Forte ............................. | 455/555 |
| 7,356,001 B1 | 4/2008 | Jones et al. | |

(Continued)

OTHER PUBLICATIONS

SpectraLink, "The Link Wireless Telephone System versus Licensed Wireless Office Services (WOS)," Jan. 2001.

(Continued)

*Primary Examiner* — Tuan H Nguyen (57) ABSTRACT

A multi-mode mobile station is able to wirelessly communicate with a wireless wide area network (WWAN) and with a wireless local area network (WLAN). The WLAN includes a "virtual" visitor location register (VVLR) for storing information about multi-mode mobile stations being served by the WLAN. The VVLR communicates with a home location register (HLR) in the WWAN in order to facilitate roaming between the WWAN and WLAN by the multi-mode mobile station.

20 Claims, 4 Drawing Sheets

U.S. PATENT DOCUMENTS

| | | | |
|---|---|---|---|
| 7,805,161 | B1 | 9/2010 | Jones et al. |
| 2002/0059434 | A1* | 5/2002 | Karaoguz et al. ............. 709/228 |
| 2002/0085516 | A1 | 7/2002 | Bridgelall |
| 2002/0101860 | A1* | 8/2002 | Thornton et al. ............. 370/352 |
| 2003/0031160 | A1 | 2/2003 | Gibson Ang et al. |
| 2003/0043974 | A1 | 3/2003 | Emerson, III |
| 2003/0053434 | A1 | 3/2003 | Chow et al. |
| 2003/0063581 | A1 | 4/2003 | Shanbhag et al. |
| 2003/0081565 | A1 | 5/2003 | McIntosh et al. |
| 2003/0134636 | A1 | 7/2003 | Sundar et al. |

OTHER PUBLICATIONS

Mun Choon Chan and Thomas Y.C. Woo, "Next-Generation Wireless Data Services: Architecture and Experience," IEEE Personal Communications, pp. 20-33, Feb. 1999.

Nortel Networks, "Meridian I Technical Specifications," 2002.

Greene, et al., "Media Gateway Control Protocol Architecture and Requirements," Request for Comments 2805, pp. 1-46, Apr. 2000.

Nortel Networks, "Meridian Internet Telephony Gateway (ITG) Line 2.0," Apr. 2000.

Jerry R. Carpenter and Michael J. Stima, "New Wireless Business Communications Directions," Bell Labs Technical Journal, pp. 165-171, 1996.

Nortel Networks, "Evolution Without Discontinuity," 2002.

Nortel Networks, "Meridian I System Specifications," Sep. 1999.

Edwin E. Mier, "IP-PBX Management: Piecing It All Together," Voice 2000: Supplement to Business Communications Review, Feb. 2000, pp. 8-15.

C. Perkins, Network Working Group, "IP Mobility Support," Request for Comments 2002, pp. 1-74, Oct. 1996.

International Packet Communications Consortium, "Packet Communications Reference Architecture," v. 2.0, pp. 1-18, Apr. 2003.

International Packet Communications Consortium, "Softswitching in Wireless," pp. 1-30, Apr. 2003.

Ericsson, "WebSwitch 2000: Take Your Office Into the Future With Our All-in-one IP Communication Platform," Jun. 2002.

Intel, "Managed Migration to IP Telephony in a PBX Environment: Intel NetStructure PBX-IP Media Gateway Can Provide the Critical Link," pp. 1-12, Nov. 2002.

* cited by examiner

VIRTUAL VISITOR LOCATION REGISTER FOR A WIRELESS LOCAL AREA NETWORK

CROSS-REFERENCE TO RELATED APPLICATIONS

This application is a continuation of U.S. patent application Ser. No. 10/644,513, entitled "Virtual Visitor Location Register For A Wireless Local Area Network," filed Aug. 20, 2003, now pending, which is a continuation-in-part of U.S. patent application Ser. No. 10/161,497, entitled "Method and System for Diverting Wireless Network Communications," filed Jun. 3, 2002, now U.S. Pat. No. 7,356,001, issued Apr. 8, 2008, all of which are incorporated herein by reference.

BACKGROUND

1. Field of the Invention

The present invention relates to telecommunications and, more particularly, to a "virtual" visitor location register for a wireless local area network.

2. Description of Related Art

A traditional enterprise telephone network includes a number of landline extension telephones (either analog or digital) connected to a private branch exchange (PBX). The PBX, in turn, is connected to the public switched telephone network (PSTN), e.g., via a primary rate interface or a basic rate interface. Increasingly, however, more diverse types of communication devices are being used in enterprise networks. For example, the PBX may be connected via a local area network (LAN) to packet-based communication devices, such as voice-over-packet (VoP) telephones or audio-equipped personal computers. In addition, the PBX may be an "JP-PBX" communicatively coupled to a packet-switched network, such as the Internet, instead of or in addition to the PSTN.

The PBX may also be part of a wireless local area network (WLAN) that includes one or more wireless access points for communicating with mobile stations over air interfaces. Such mobile stations may include wireless telephones, wirelessly-equipped personal digital assistants (PDAs), wirelessly-equipped laptop computers, and/or other wireless communication devices. The air interface communications may conform to a WLAN specification, such as IEEE 802.11b, Bluetooth, HomeRF, or HiperLAN. Alternatively, or additionally, the air interface communication may occur in a cordless telephone format, in a Multichannel Multipoint Distribution Service (MMDS) format, or in some other format. Some of these mobile stations may also be able to communicate with a wireless wide area network (WWAN), using an air interface format such as CDMA or GSM. Thus, when a multi-mode mobile station is within the wireless coverage area of the WLAN, it may use the WLAN for communication, and when the multi-mode mobile station is within the wireless coverage of the WWAN, it may use the WWAN for communication.

WWAN signaling protocols, such as IS-41, typically support roaming between areas served by different serving systems. For example, each serving system in a WWAN may include a visitor location register (VLR) that communicates with a home location register (HLR) for mobility management and other purposes. Now, with the interest in multi-mode mobile stations that may be in communication with either a WWAN or a WLAN at any given time, there is a need to provide additional systems and methods for mobility management in order to facilitate roaming between the WWAN and WLAN. For example, it is desirable to be able to reach a multi-mode mobile station by dialing the same directory number, regardless of whether the multi-mode mobile station is in communication with the WWAN or with the WLAN.

SUMMARY

In a first principal aspect, an exemplary embodiment of the present invention provides a wireless local area network (WLAN) for providing wireless telecommunications services to a multi-mode mobile station. The multi-mode mobile station is able to wirelessly communicate with a wireless wide area network (WWAN) when operating in a first wireless coverage area. The WWAN includes a first data register that contains a first data record for the multi-mode mobile station. The WLAN comprises at least one wireless access point, a private branch exchange (PBX) communicatively coupled to the at least one wireless access point, and a second data register communicatively coupled to the PBX and to the first data register. The at least one wireless access point provides a second wireless coverage area, within which the multi-mode mobile station is able to wirelessly communicate with the at least one wireless access point. The second data register is able to transmit at least one mobility management message to the first data register. The at least one mobility management message facilitates roaming between the first and second wireless coverage areas by the multi-mode mobile station.

In a second principal aspect, an exemplary embodiment of the present invention provides a method of mobility management of a multi-mode mobile station that is able to wirelessly communicate with a wireless wide area network (WWAN) and with a wireless local area network (WLAN). In accordance with the method, the multi-mode mobile station associates with a wireless access point of the WLAN. The WLAN includes a private branch exchange (PBX). The PBX stores information regarding the multi-mode mobile station in a WLAN data register. The WLAN data register sends a registration message to a WWAN data register in a WWAN. The registration message identifies the multi-mode mobile station.

DETAILED DESCRIPTION OF EXEMPLARY EMBODIMENTS

The present invention, in exemplary embodiments, facilitates the roaming of multi-mode mobile stations between a wireless wide area network (WWAN) and a wireless local area network (WLAN). In an exemplary embodiment, a multi-mode mobile station may be reached by dialing the same directory number, regardless of whether the multi-mode mobile station is in communication with the WWAN or with the WLAN. A PBX of the WLAN is provided with a data register that keeps track of which multi-mode mobile stations are registered for services with the PBX. For convenience, this data register is referred to herein as a "virtual" visitor location register (VVLR), though it is to be understood that a VVLR need not perform all of the same functions or engage in the same signaling as a VLR would in a WWAN.

As used herein, a "WLAN" refers to a local area network that includes at least one wireless access point. Thus, in a WLAN, some devices may communicate wirelessly, but other devices may communicate over wired communications. As used herein, a "PBX" refers to a system that controls telephony services in the WLAN. Preferably, the PBX is an "IP-PBX" communicatively coupled to a packet-switched network. Alternatively or additionally, the PBX may be connected to the PSTN, e.g., via a primary rate interface or a basic rate interface. The PBX may be directly connected to the WLAN. Alternatively, the PBX could be communicatively coupled to the WLAN so as to control telephony services in the WLAN remotely. In addition, the PBX could be provided as a single device or as a distributed system. Thus, the PBX could be a hosted PBX or an IP-Centrex system, for example. The VVLR may be integrated with or otherwise accessible by the PBX.

The VVLR for the WLAN communicates with a home location register (HLR) for the WWAN in order to help manage the mobility of multi-mode mobile stations. In an exemplary embodiment, the communications between the VVLR and the HLR may conform to a WWAN signaling protocol, such as IS-41. However, other signaling protocols, such as SIP, SIP-T, or H.323 could be used. In addition, the VVLR may communicate using one protocol, such as SIP, and the HLR may communicate in another protocol, such as IS-41, with a signaling gateway converting between the two protocols. Such conversion may involve encapsulation/de-encapsulation, e.g., of IS-41 messages in SIP or SIP-T messages. Alternatively or additionally, the conversion may involve translation, i.e., mapping between message types and/or parameters.

In the example where the VVLR and HLR both communicate using IS-41, the VVLR may send an IS-41 Registration Notification (REGNOT) message to the HLR when a multi-mode mobile station registers for services in the WLAN. In this way, the HLR is notified that the multi-mode mobile station is an area being served by the VVLR. Then, when a call is placed to a directory number associated with the multi-mode mobile station, the HLR may send an IS-41 Routing Request (ROUTEREQ) message to the VVLR to obtain routing information that can be used to route the call to the multi-mode mobile station. The routing information could be a directory number assigned to the PBX, in which case the call may be routed to the PBX via the PSTN. Alternatively, the routing information could result in the call being routed to the PBX via a packet-switched network. In particular, the routing information could be a directory number assigned to a media gateway communicatively coupled to the PBX via a packet-switched network, or the routing information could be an Internet Protocol (IP) address of the PBX or of the multi-mode mobile station. Other types of routing information could also be used.

In addition to REGNOT and ROUTEREQ messages, the VVLR and HLR could exchange other messages, for mobility management purposes or for other purposes. The VVLR may also store a data record for each multi-mode mobile station being served by the WLAN. The data record may include a service profile that the VVLR obtained from the HLR, e.g., in response to a REGNOT message. In this way, the services available to the multi-mode mobile station when served by the WWAN may also be available to the multi-mode mobile station when served by the WLAN.

1. Exemplary Network Architecture

Figure 1:
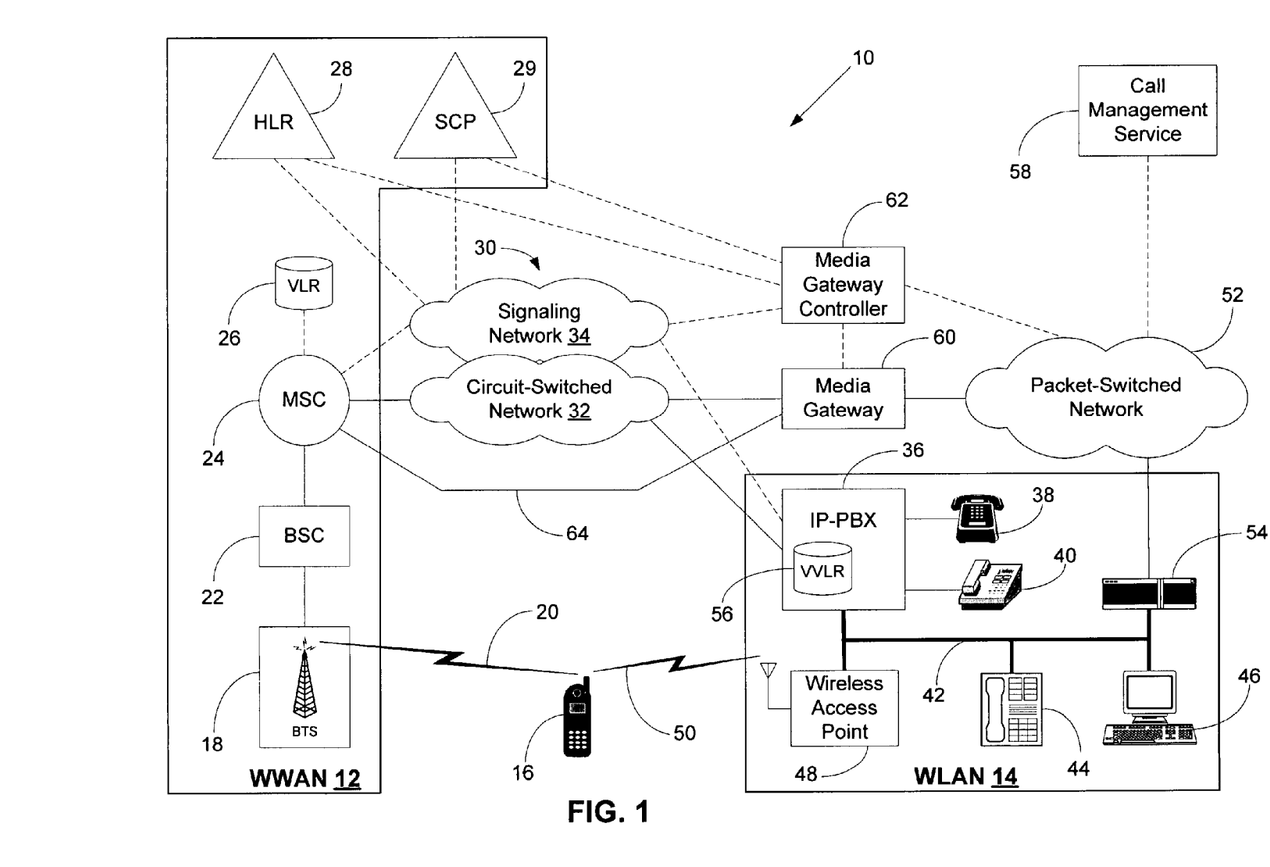
FIG. 1 is a simplified block diagram of a wireless telecommunications system, in accordance with an exemplary embodiment of the present invention.

FIG. 1 is a simplified block diagram of an exemplary wireless telecommunications system 10. In FIG. 1, connections that carry voice or other media are shown as solid lines and connections that carry primarily signaling are shown as dashed lines.

Wireless telecommunications system 10 includes network elements that function together as a wireless wide area network (WWAN) 12 and network elements that function together as a wireless local area network (WLAN) 14. WWAN 12 may provide wireless coverage in a relatively large geographic area, such as an entire city, often by using a plurality of contiguous wireless coverage areas, such as cells or sectors. The wireless communication in WWAN 12 may occur in an analog format, such as the Advanced Mobile Phone Service (AMPS), or in a digital format, such as code division multiple access (CDMA), time division multiple access (TDMA), or Global System for Mobile communication (GSM). The wireless communication may occur in licensed frequency bands, such as the 1.9 GHz PCS bands. WLAN 14 may provide wireless coverage in a relatively limited area, as compared to WWAN 12, such as in a building or part of a building. In addition, WLAN may use one or more unlicensed frequency bands, such as the unlicensed frequency band in the 2.4 GHz range.

A multi-mode mobile station 16 is able to wirelessly communicate with WWAN 12 and with WLAN 14. More particularly, multi-mode mobile station 16 is able to communicate with WWAN 12 when operating in an area served by WWAN 12 and is able to communicate with WLAN 14 when operating in an area served by WLAN 14. In some areas, the wireless coverage of WWAN 12 and WLAN 14 may be overlapping, and multi-mode mobile station 16 may decide whether to communicate with WWAN 12, with WWAN 14, or with both. Multi-mode mobile station 16 may be a wireless telephone, wirelessly-equipped personal digital assistants (PDA), wirelessly-equipped laptop computer, or other type of wireless communication device.

WWAN 12 may include a base transceiver station (BTS) 18 that provides a wireless coverage area within which BTS 18 may communicate with one or more mobile stations, such as multi-mode mobile station 16, over an air interface 20. Although FIG. 1 shows only BTS 18, WWAN 12 may include a plurality of BTSs that may provide a plurality of wireless coverage areas. The communications between BTS 18 and multi-mode mobile station 16 may occur in a digital format, such as CDMA, TDMA, GSM, or they may occur in an analog format, such as AMPS. A preferred wireless communications format is cdma2000 such as described in EIA/TIA/IS-2000 Series, Rev. A (published March 2000), which is incorporated herein by reference.

BTS 18 may be controlled by a base station controller (BSC) 22, which, in turn, may be controlled by a mobile switching center (MSC) 24. Although FIG. 1 shows only one MSC and only one BSC, WWAN 12 may include a plurality of MSCs, which may, in turn, control a plurality of BTSs, via a plurality of BSCs. MSC 24 also has access to a visitor location register (VLR) 26. VLR 26 stores data records for mobile stations, such as multi-mode mobile station 16, that are being served by MSC 24. A data record stored in VLR 26 for a mobile station typically identifies the mobile station, e.g., by mobile identification number (MIN), mobile directory number (MDN), mobile station identification (MSID), and/or electronic serial number (ESN). The data record may also include status information for the mobile station, such as whether the mobile station is busy, and may also include a service profile that identifies the services to which the mobile station subscribes. The data record may also include other information relating to the mobile station. VLR 26 may obtain some of the information in the data record for the mobile station from a home location register (HLR) 28 associated with the mobile station, e.g., using IS-41 signaling. Although FIG. 1 shows VLR 26 as a network element separate from MSC 24, VLR 26 may be integrated or co-located with MSC 24.

In the example shown in FIG. 1, WWAN 12 is the "home" network of multi-mode mobile station 16, in that WWAN 12 includes a home location register (HLR) 28 associated with multi-mode mobile station 16. HLR 28 stores a data record for multi-mode mobile station 16. The data record stored in HLR 28 for multi-mode mobile station 16 identifies multi-mode mobile station 16, such as by MDN, MIN, MSID, and/or ESN and includes a last known location of multi-mode mobile station 16, e.g., identifies the VLR that most recently registered multi-mode mobile station 16 with HLR 28. The data record may also include status information for multi-mode mobile station 16, a service profile for multi-mode mobile station 16, and other information relating to multi-mode mobile station 16. WWAN 12 may also include a service control point (SCP) 29. SCP 29 may include service logic that specifies how to provide telecommunications services to mobile stations such as multi-mode mobile station 16.

MSC 24 is connected to the public switched telephone network (PSTN) 30. PSTN 30 may use an out-of-band signaling system, such as Signaling System 7 (SS7) to route calls. Thus, PSTN 30 may include a circuit-switched network 32 that carries bearer traffic, i.e., the voice or other media in calls, and a signaling network 34 that carries signaling traffic used to set up, tear down, monitor, and control calls. Circuit-switched network 32 may include a plurality of trunks, with each trunk carrying media in a pulse code modulation (PCM) format in a plurality of time-domain multiplexed channels. Signaling system 34 may include a plurality of networked signal transfer points (STPs).

MSC 24 may communicate with signaling network 34, e.g., using SS7, to route calls via circuit-switched network 32 to and from mobile stations being served by WWAN 12, such as multi-mode mobile station 16. To provide telecommunications services to mobile stations being served by WWAN 12, such as multi-mode mobile station 16, MSC 24 may also communicate with HLR 28 and SCP 29 via signaling network 34. The communications between MSC 24 and HLR 28 may conform to IS-41 specifications. A recent revision of the IS-41 specifications, ANSI/TIA/EIA-41-D-97, published in December 1997, is incorporated herein by reference. The communications between MSC 24 and SCP 29 may conform to the specification "Wireless Intelligent Network," TIA/EIA/IS-771, published in July 1999, which is incorporated herein by reference. The IS-41 and IS-771 signaling may be carried in an SS7 application layer in signaling network 34.

Using SS7, IS-41, IS-771, and/or other signaling carried in signaling network 34, MSC 24 may connect incoming calls from PSTN 30 to multi-mode mobile station 16, which calls may originate from calling parties using landline telephones, mobile stations, or other communication devices. Similarly, MSC 24 may use SS7, IS-41, IS-771, and/or other signaling carried in signaling network 34 to route calls originating from multi-mode mobile station 16 through PSTN 30. In addition, MSC 24 may be a "home" MSC of multi-mode mobile station 16, in that multi-mode mobile station 16 may have a mobile directory number (MDN) that is assigned to MSC 24. Thus, calls placed to this MDN may be routed to MSC 24 by PSTN 30.

WLAN 14 includes a private branch exchange (PBX) 36 that may be communicatively coupled to a variety of wireline and/or wireless communication devices. For example, PBX 36 may be connected to analog telephony devices, such as analog telephone 38, facsimile machines, and/or modems. PBX 36 may also be connected to digital telephony devices, such as digital telephone 40. PBX 36 may also be communicatively coupled, e.g., via a local area network (LAN) 42, to communication devices that exchange media in a packet-based format. For example, LAN 42 may be connected to a voice-over-packet (VoP) telephone 44 and to a personal computer 46, equipped for audio communication, e.g., equipped with a microphone and speaker. LAN 42 may also connected to one or more wireless access points, such as wireless access point 48. LAN 42 may also be connected to other devices.

Wireless access point 48 provides a wireless coverage area within which wireless access point 48 is able to communicate with wireless communication devices, such as multi-mode mobile station 16, over an air interface 50. More particularly, wireless access point 48 may communicate with multi-mode wireless communications devices, e.g., that are able to communicate with both a WWAN, such as WWAN 12, and a WLAN, such as WLAN 14. Wireless access point 48 may also communicate with wireless communication devices that may only be able to communicate with WLANs such as WLAN 14. The wireless communication between wireless access point 48 and multi-mode mobile station 16 may conform to or make use of IEEE 802.11a, IEEE 802.11b, IEEE 802.11e, IEEE 802.11g, or IEEE 802.11h standards (referred to generally herein as "802.11x"), or variations thereof. These 802.11x standards are incorporated herein by reference. Alternatively or additionally, the wireless communication may conform to or make use of Bluetooth specifications, HomeRF specifications, of HiperLAN standards, or may occur in a cordless communication format or a Multichannel Multipoint Distribution Service (MMDS) format, or may involve some other protocol or format.

PBX 36 may be connected to PSTN 30, e.g., to both circuit-switched network 32 and signaling network 34. Thus, PBX 36 may be able to terminate calls to and originate calls from communication devices coupled to PBX 36, via PSTN 30. Alternatively, or additionally, PBX 36 may be an "IP-PBX" connected to a packet-switched network 52, e.g., via LAN 42 and a router 54. Thus, PBX 36 may be able to terminate calls to and originate calls from communication devices coupled to PBX 36, via packet-switched network 52. If PBX 36 is connected to both PSTN 30 and packet-switched network 52, then PBX 36 may use PSTN 30 for some calls and may use packet-switched network 52 for other calls. For example, PBX 36 may preferentially use PSTN 30 to originate calls from certain communication devices, e.g., analog telephone 38 and digital telephone 40, but PBX 36 may preferentially use packet-switched network 52 to originate calls from certain other communication devices, e.g., VoP telephone 44, audio-equipped computer 46, and wireless devices in communication with wireless access point 48, such as multi-mode mobile station 16. As another example, PBX 36 may preferentially use packet-switched network 52 for certain types of calls, such as long-distance calls.

Packet-switched network 52 may include one or more local area networks (LANs) and/or one or more wide area network (WANs), such as the Internet. Packet-switched network 52 may route packets using a network protocol, such as the Internet Protocol (IP), in combination with the User Datagram Protocol (UDP) or Transmission Control Protocol (TCP). The IP packets may be carried over lower level protocols, such as asynchronous transfer mode (ATM) protocols.

Protocols, such as the Real-Time Transport Protocol (RTP), may be used to carry voice or other media through packet-switched network 52 in a real-time format. Relevant aspects of RTP are described in Schulzrinne, et al., "RTP: A Transport Protocol for Real-Time Applications," Request for Comments 1889 (January 1996), which is incorporated herein by reference.

Other protocols, such as the Session Initiation Protocol (SIP) or the Session Initiation Protocol for Telephones (SIP-T), may be used to set up and/or manage communication sessions through packet-switched network 52. Relevant aspects of SIP are described in Rosenberg, et al., "SIP: Session Initiation Protocol," Request for Comments 3261 (June 2002), which is incorporated herein by reference. Relevant aspects of SIP-T are described in Vemuri, et al., "Session Initiation Protocol for Telephones (SIP-T): Context and Architectures," Request for Comments 3372 (September 2002), which is incorporated herein by reference. SIP and/or other protocols may, in turn, use the Session Description Protocol (SDP) to describe the communication sessions that are being set up or managed. Relevant aspects of SDP are described in M. Handley, et al., "SDP: Session Description Protocol," Request for Comments 2327 (April 1998), which is incorporated herein by reference.

In an exemplary embodiment, SIP is used to set up calls through packet-switched network 52 that involve WLAN 14. WLAN 14 may include one or more SIP user agents for this SIP signaling. For example, PBX 36 may include a SIP user agent to engage in SIP signaling on behalf of communication devices coupled to PBX 36. Alternatively or additionally, one or more communication devices coupled to PBX 36 may have SIP user agents of their own. For example, multi-mode mobile station 16 may have its own SIP user agent.

WLAN 14 also includes a virtual visitor location register (VVLR) 56 that helps to manage the mobility of multi-mode mobile stations, such as multi-mode mobile station 16. VVLR 56 may be integrated or co-located with PBX 36, as shown in FIG. 1. Alternatively, VVLR 56 may be provided in a separate network element that is accessible by PBX 36, e.g., via LAN 42. As described in more detail below, VVLR 56 communicates with HLR 28 for mobility management purposes. More particularly, VVLR 56 may communicate with HLR 28 using IS-41 or some other protocol, such as SIP, SIP-T, or H.323, and one or more other network elements may convert between the protocols used by VVLR 56 and the protocols used by HLR 28. VVLR 56 may also store data records for the multi-mode mobile stations being served by WLAN 14. For example, a data record stored in VVLR 56 for multi-mode mobile station 16 may include one or more of the following: the MAC and/or IP address of multi-mode mobile station 16, the user name and/or SIP address of the user of multi-mode mobile station 16, and the MIN, MDN, MSID, and/or ESN of multi-mode mobile station 16. Thus, VVLR 56 may play a role that is analogous to that of an IS-41 VLR. However, VVLR 56 does not necessarily perform all of the functions of an IS-41 VLR and does not necessarily operate in accordance with IS-41 specifications.

A call management service 58 may control calls and other communication sessions in packet-switched network 52 that involve WLAN 14. For example, if SIP is used to establish, tear down, or otherwise manage calls through packet-switched network 52, call management service 58 may function as a SIP proxy server and SIP registrar for WLAN 14. Thus, SIP user agents in WLAN 14 may engage in SIP signaling with call management service 58 to register communication devices communicatively coupled to WLAN 14 and to originate and terminate calls through packet-switched network 52 for such registered communication devices. Call management service 58 may also perform other functions. Although FIG. 1 shows call management service 58 as a separate network element, call management service 58 may be integrated with another network element, such as a media gateway controller.

Packet-switched network 52 may be communicatively coupled to circuit-switched network 32 via a media gateway 60. Media gateway 60 may convert between media formats used in circuit-switched network 30 and packet-switched network 52. For example, media gateway 60 may receive media from circuit-switched network 32 in a PCM format and convert the media into an RTP format for transmission over packet-switched network 52, and vice-versa.

A media gateway controller 62 may control media gateway 60, e.g., using the Media Gateway Control Protocol (MGCP). Relevant aspects of MGCP are described in F. Andreason, et al., "Media Gateway Control Protocol (MGCP) Version 1.0," Request for Comments 3435 (January 2003), which is incorporated herein by reference. Media gateway controller 62 may be connected to signaling network 34 and to packet-switched network 52. Media gateway controller 62 may engage in SS7 or other signaling to route calls to and from media gateway 60 through PSTN 30, and media gateway controller may use SIP and/or other protocols to route calls to and from media gateway 60 through packet-switched network 52.

Thus, media gateway controller 62 may function as a signaling gateway, converting between legacy signaling protocols, such as SS7, IS-41, and/or IS-771, and voice-over-packet signaling protocols, such as SIP, SIP-T, and/or H.323. For example, PBX 36 and/or VVLR 56 may communicate with HLR 28 and/or SCP 29 via media gateway controller 62, with media gateway controller 62 converting between the SIP, SIP-T, H.323, or other protocols used by PBX 36 and/or VVLR 56 and the SS7, IS-41, IS-771, or other protocols used by HLR 28 and/or SCP 29. The conversions performed by media gateway controller 62 may involve encapsulation/de-encapsulation of messages and/or translation of messages, i.e., mapping between message types and message parameters. Media gateway controller 62 may also perform other functions. For example, call management service 58 may be a part of media gateway controller 62.

Calls may reach media gateway 60 via PSTN 30 by routing to a directory number assigned to media gateway 60. If the directory number is also associated with a network element accessible via packet-switched network 52, such as a communication device in WLAN 14, then the call may also be routed from media gateway 60 through packet-switched network 52. However, calls may also reach media gateway 60 in other ways. For example, media gateway 60 may be integrated with other network elements, such as MSC 24. As a result, if a call is routed through PSTN 30 to MSC 24, e.g., based on a directory number assigned to MSC 24, then MSC 24 may not need to send the call again through PSTN 30 in order to have the call reach packet-switched network 52. Instead, MSC 24 may use media gateway 60 integrated with it to send the call directly to packet-switched network 52. As another example, media gateway 60 may be connected to MSC 24 via an intermachine trunk (IMT) 64. In that case, MSC 24 may use a trunk and port number of IMT 64, instead of a directory number, to send a call to media gateway 60.

2. Exemplary Operation

Figure 2:
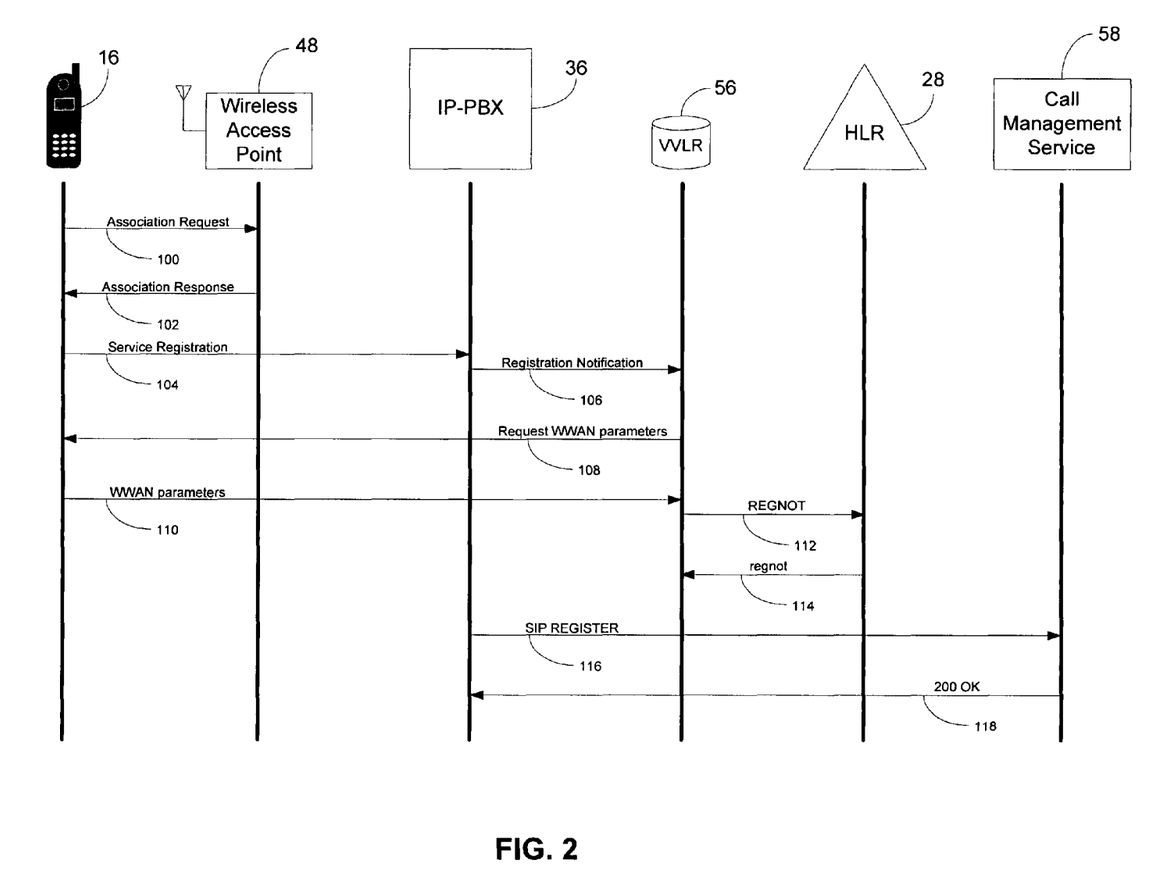
FIG. 2 is a simplified call flow diagram illustrating a registration process, in accordance with an exemplary embodiment of the present invention.

FIG. 2 illustrates an exemplary call flow that may be used to register multi-mode mobile station 16. The process may begin when multi-mode mobile station 16 transmits an association request, e.g., in accordance with 802.11x protocols, to associate with wireless access point 48, as indicated by step 100. Step 100 may occur, for example, when multi-mode mobile station 16 is being served by another wireless network, such as WWAN 12, or is not being served by any wireless network, but detects radio frequency (RF) emissions from WLAN 14. Multi-mode mobile station 16 may use a number of different methods to determine when to try to detect RF that may emanate from a WLAN. For example, multi-mode mobile station 16 may periodically check for RF emissions in frequency bands that may be used by WLANs, e.g., frequency bands in the 2.4 GHz range. Alternatively, multi-mode mobile station 16 may use information about its current location to determine when to check for RF from WLANs. Examples of such approaches are described in a U.S. patent application Ser. No. 10/391,158 titled "Method for Determining Availability of a Radio Network," filed on Mar. 18, 2003, which is incorporated herein by reference. Step 100 may also occur when multi-mode mobile station 16 is being served by another wireless access point in WLAN 14 and moves into an area in which wireless access point 48 provides better coverage.

It is to be understood that FIG. 2 shows step 100 in a simplified form. In particular, the signaling involved in associating with WLAN 14 may depend on the particular air interface protocol that is used and may involve the exchange of several messages between multi-mode mobile station 16 and wireless access point 48. For example, the signaling may involve procedures to authenticate multi-mode mobile station 16 for access to WLAN 14. For example, WLAN 14 may require multi-mode mobile station 16 to transmit a valid username, password, PIN number, digital certificate, MAC address, or other code or identifier before granting access. If the association request of step 100 is accepted, then wireless access point 48 may transmit an association response indicating that multi-mode mobile station 16 is now associated with wireless access point 48, as indicated by step 102. Multi-mobile station 16 may then transmit a service registration message in order to register for services with PBX 36, as indicated by step 104. The service registration message may identify multi-mode mobile station 16, such as by IP address and/or MAC address. The service registration message may conform to a protocol such as H.323 or Cisco's Skinny Client Control Protocol. Other protocols could be used, however. A recent version of the H.323 protocol is described in International Telecommunication Union, Recommendation H.323, "Packet-based Multimedia System" (November 2000), which is incorporated herein by reference.

As indicated by step 106, PBX 36 may then send VVLR 56 a registration notification message to notify VVLR 56 that multi-mode mobile station 16 has registered for services. The registration notification message may also identify multi-mode mobile station 16, such as by IP address and/or MAC address. In response to the registration notification of step 106, VVLR 56 may create or update a data record for multi-mode mobile station 16. The data record may identify multi-mode mobile station 16, such as by IP address or MAC address. The data record may also include other information relating to multi-mode mobile station 16. In some cases, VVLR 56 may update an existing data record for multi-mode mobile station 16 when VVLR 56 receives the association notification of step 104. In other cases, VVLR 56 may create a new data record for multi-mode mobile station 16 in response to the association notification of step 106.

As noted above, VVLR 56 may communicate with HLR 28 for purposes of managing the mobility of multi-mode mobile stations, such as multi-mode mobile station 16. However, HLR 28 and WWAN 12 may identify multi-mode mobile station 16 differently than WLAN 14. For example, HLR 28 and WWAN 12 may identify multi-mode mobile station 16 by MIN, MDN, MSID, and/or ESN, and may also require other information regarding multi-mode mobile station 16. In some cases, VVLR 56 may have access to such WWAN parameters of multi-mode mobile station 16 because the WWAN parameters may have already been provisioned in PBX 36 and/or VVLR 56. In other cases, multi-mode mobile station 16 may transmit the WWAN parameters automatically, e.g., in the service registration message of step 104. In still other cases, VVLR 56 may request WWAN parameters from multi-mode mobile station 16, such as MIN, MDN, MSCID, and/or ESN, as indicated by step 108. Multi-mode mobile station 16 may then respond with the requested WWAN parameters, as indicated by step 110.

VVLR 56 may then send HLR 28 an IS-41 Registration Notification (REGNOT) message, as indicated by step 112. The REGNOT message indicates that multi-mode mobile station 16 is now operating in an area served by VVLR 56, e.g., by identifying VVLR 56 as currently serving multi-mode mobile station 16. The REGNOT message may identify multi-mode mobile station 16, such as by MIN, MDN, MSID, and/or ESN, and may also identify VVLR 56. For example, even though it is not an MSC, VVLR 56 may identify itself by a "MSCID" for purposes of IS-41 signaling. The REGNOT message may also include other information.

In response to the REGNOT message of step 112, HLR 28 may update the data record it maintains for multi-mode mobile station 16 to indicate that multi-mode mobile station 16 is currently being served by VVLR 56. HLR 28 also sends VVLR 56 an IS-41 regnot response, as indicated by step 114. The regnot response may include a service profile for multi-mode mobile station 16, and VVLR 56 may store the service profile as part of its data record for multi-mode mobile station 16. HLR 28 may also cancel any previous registrations. For example, if multi-mode mobile station 16 had been previously been served by WWAN 12 and registered in VLR 26, then HLR 28 may send VLR 26 an IS-41 Registration Cancellation (REGCANC) message to cancel the registration of multi-mode mobile station 16 in VLR 26.

Although steps 112 and 114 have been described with respect to the IS-41 protocols, it is to be understood that VVLR 56 may use other protocols, such as SIP, SIP-T, or H.323, for communicating with HLR 28. For example, VVLR 56 may use a SIP user agent, which may be located in PBX 36, to communicate with media gateway controller 62, via packet switched network 52, using the SIP protocol. Media gateway controller 62 may, in turn, communicate with HLR 28 using IS-41, converting between the SIP messages used by VVLR 56 and the IS-41 messages used by HLR 28. This conversion may involve encapsulation/de-encapsulation of IS-41 messages in SIP message and/or mapping between message types and message parameters.

The service profile provided to VVLR 56 in step 114 may identify any call origination services, call termination services, or other services that multi-mode mobile station 16 subscribes to in WWAN 12. In some embodiments, PBX 36 may use this service profile information to provide multi-mode mobile station 16 with the same or similar services that multi-mode mobile station 16 would have when served by WWAN 12. In other embodiments, PBX 36 may provide multi-mode mobile station 16 with services that are different from the services that multi-mode mobile station 16 would have when served by WWAN 12.

After multi-mode mobile station 16 associates with wireless access point 48, multi-mode mobile station 16 may also become registered with call management service 58. For example, if SIP is used to set up calls through packet-switched network 52, then a SIP user agent may send a SIP REGISTER message to call management service 58, as indicated by step 116. FIG. 2 assumes that the SIP user agent is in PBX 36. Alternatively, however, multi-mode mobile station 16 may have its own SIP user agent, in which case the SIP REGISTER message may originate from multi-mode mobile station 16. In response to the SIP REGISTER message, call management service 58 may store an indication that multi-mode mobile station 16 is reachable at WLAN 14. Call management service 58 may also associate multi-mode mobile station 16 with a directory number that can be used to reach multi-mode mobile station 16, e.g., a directory number assigned to media gateway 60.

Figure 3:
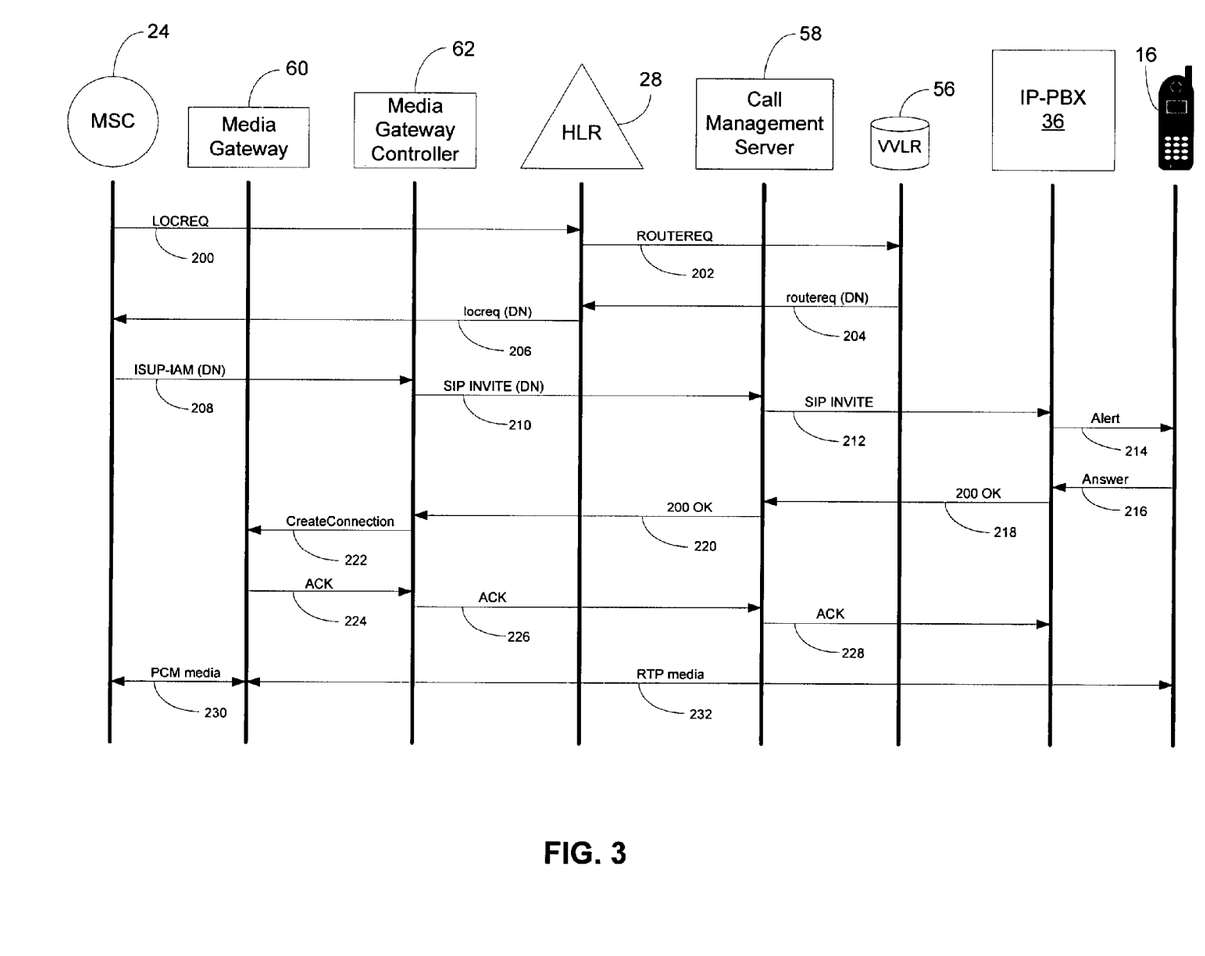
FIG. 3 is a simplified call flow diagram illustrating signaling to set up a call, in accordance with an exemplary embodiment of the present invention.

FIG. 3 is an exemplary call flow diagram illustrating an exemplary process that may be used to route a call to multi-mode mobile station 16 when multi-mode mobile station 16 is being served by WLAN 14. It is to be understood that multi-mode mobile station 16 will at this point already be registered with VVLR 56, HLR 28, and call management service 58, e.g., using signaling like that shown in FIG. 2 and described above.

The process may begin when a caller places a call to a directory number associated with multi-mode mobile station 16, for example, its MDN. The caller may place the call using a landline telephone, wireless telephone, or other communication device. In this case, the directory number is assigned to MSC 24, and MSC 24 receives the call. For example, PSTN 30 may route the call to MSC 24, or the call may originate from a mobile station operating in an area served by MSC 24. Although the directory number of multi-mode mobile station 16 is assigned to MSC 24 in this example, it is to be understood that the directory number could be assigned to other network elements instead, such as media gateway 60.

To locate multi-mode mobile station 16, MSC 24 may send HLR 28 an IS-41 Location Request (LOCREQ) message, as indicated by step 200. The LOCREQ message may identify multi-mode mobile station 16, e.g., by its MDN. In response, HLR 28 refers to its data record for multi-mode mobile station 16 and determines that multi-mode mobile station 16 was last known to be operating in an area served by VVLR 56. Thus, HLR 28 sends VVLR 56 an IS-41 Route Request (ROUTEQ) message to obtain routing information that can be used to route the call to multi-mode mobile station 16, as indicated by step 202. The ROUTEREQ message may identify multi-mode mobile station 16, such as by MIN, MDN, MSID, and/or ESN. In response, VVLR 56 sends HLR 28 an IS-41 routereq response that includes routing information that can be used to route the call to multi-mode mobile station 16, as indicated by step 204.

The routing information can be in a variety of different forms. For example, the routing information could be a directory number. The directory number may be assigned to a network element, such as PBX 36 or media gateway 60. The directory number may be used for multi-mode mobile station 16 on only a temporary basis. For example, the directory number may be associated with multi-mode mobile station 16 for only during the time when multi-mode mobile station 16 is being served by WLAN 14 or only for purposes of this particular call to multi-mode mobile station 16. Alternatively, the routing information could be an IP address, e.g., an IP address of PBX 36, VVLR 56, or multi-mode mobile station 16. Other types of routing information could also be used, such as the host name of PBX 36 or VVLR 56, or a SIP user name or address.

In the example shown in FIG. 3, the routing information in the routereq response of step 204 is a directory number (DN).

HLR 28 forwards the DN to MSC 24 in an IS-41 locreq response message, as indicated by step 206. MSC 24 then routes the call to the DN, e.g., using an SS7 ISUP-IAM message. For example, if the DN is assigned to PBX 36, then MSC 24 may use an ISUP-IAM message to route the call to PBX 36, via PSTN 30. PBX 36 may then alert multi-mode mobile station 16 of the incoming call.

However, in the example shown in FIG. 3, the DN is assigned to media gateway 60. Thus, MSC 24 may use an ISUP-IAM message to route the call to media gateway 60 via PSTN 30, as indicated by step 208. The ISUP-IAM identifies the DN as the called number. Media gateway controller 62 receives the ISUP-IAM message and engages in signaling to set up a call leg through packet-switched network 52 to a network element associated with the DN. For example, media gateway controller 62 may send call management service 58 a SIP INVITE message with the DN, as indicated by step 210. In this case, PBX 36 has previously registered multi-mode mobile station 16 with call management service 58 (step 116 shown in FIG. 2 and described above). Thus, call management service 58 may then send PBX 36 a SIP INVITE message that identifies multi-mode mobile station 16, as indicated by step 212. In response, PBX 36 may alert multi-mode mobile station 16, as indicated by step 214. In this case, multi-mode mobile station 16 answers, as indicated by step 216.

As indicated by step 218, PBX 36 then sends call management service 58 a 200 OK message to respond to the SIP INVITE message of step 212. The 200 OK message may use SDP to describe various aspects of the session to be used for carrying the media exchanged in the call through packet-switched network 52. For example, the 200 OK message confirm that RTP is to be used for the session and may specify that the RTP packets are to be sent to a particular IP address. Call management service 58 then sends media gateway controller 62 a 200 OK message, as indicated by step 220. The 200 OK message of step 220 may include the session description from the 200 OK message of step 218.

When media gateway controller 62 receives the 200 OK message of step 218, media gateway controller 62 may instruct media gateway 60 to create a connection between the call media gateway 60 received from MSC 24 (on the circuit-switched side) and the RTP session described in the 200 OK message of step 220 (on the packet-switched side). For example, media gateway controller 62 may send media gateway 60 an MGCP CreateConnection message, as indicated by step 222. In response, media gateway 60 creates the requested connection and sends media gateway controller 62 an acknowledgement, as indicated by step 224. Then, media gateway controller 62 then sends call management service 58 an acknowledgement, as indicated by step 226, and call management service 58 sends PBX 36 an acknowledgement, as indicated by step 228.

At this point, the call is established between the caller and multi-mode mobile station 16. The voice or other media exchanged between the caller and multi-mode mobile station 16 may be carried between MSC 24 and media gateway, via circuit-switched network 32, in a PCM format, as indicated by step 230, and may be carried between media gateway 60 and multi-mode mobile station 16, via packet-switched network 52, in an RTP format, as indicated by step 232.

Figure 4:
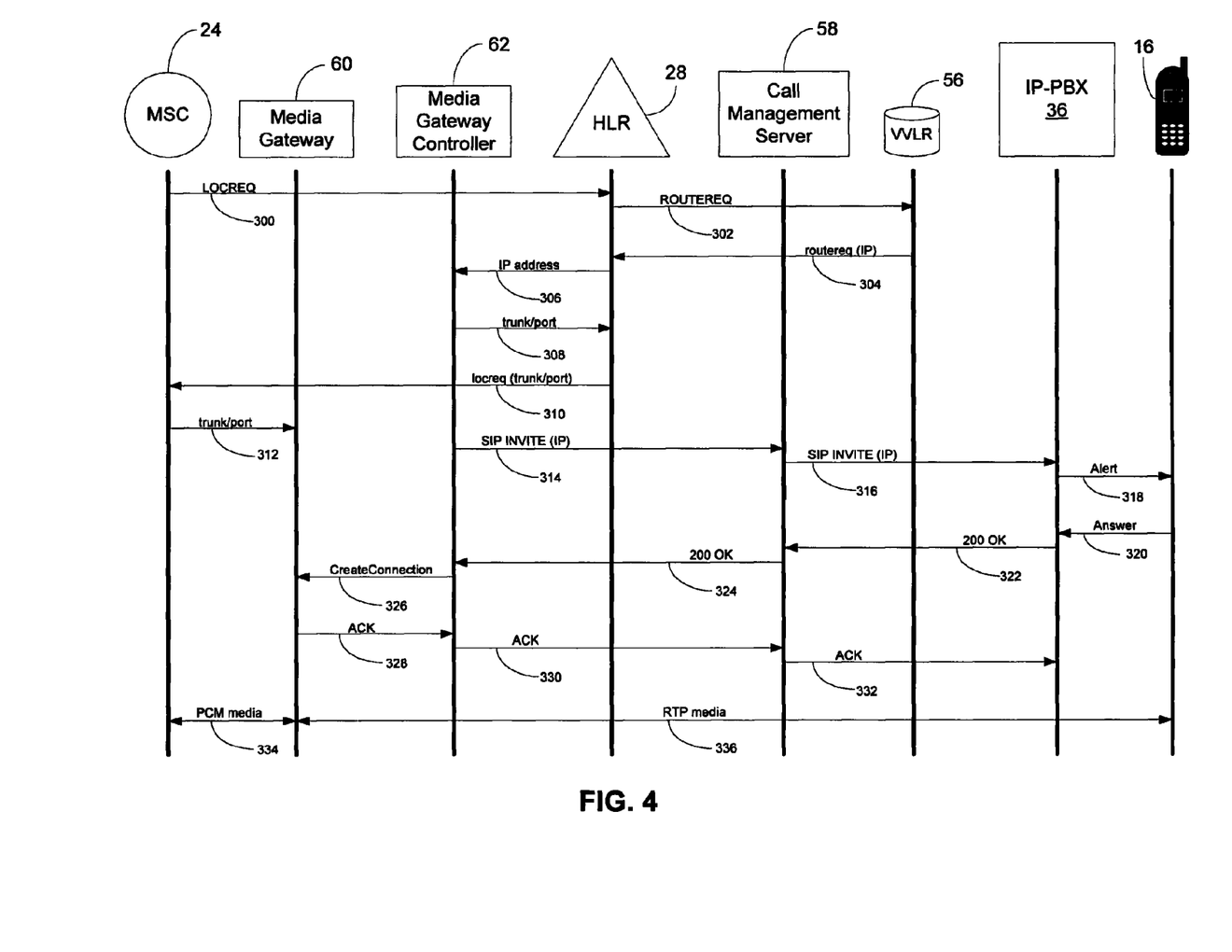
FIG. 4 is a simplified call flow diagram illustrating signaling to set up a call, in accordance with an exemplary embodiment of the present invention.

FIG. 4 shows an exemplary call flow for the case that VVLR 56 returns an IP address as the routing information to route a call to multi-mode mobile station 16. The IP address may be associated with PBX 36 or with multi-mode mobile station 16, for example. In addition, FIG. 4 assumes that MSC 24 and media gateway 60 are connected by an intermachine trunk (IMT), e.g., IMT 64. The process may begin when MSC 24 receives a call to a directory number associated with multi-mode mobile station 16. Thus, MSC 24 may send HLR 28 a LOCREQ message, as indicated by step 300, and HLR 28 may send a ROUTEREQ message to VVLR 56, as indicated by step 302, e.g., in a manner similar to the example of FIG. 3. In this example, however, VVLR 56 sends HLR 28 a locreq response that includes an IP address as the routing information to route the call to multi-mode mobile station 16, as indicated by step 304.

Although steps 302 and 304 have been described with respect to the IS-41 protocols, it is to be understood that VVLR 56 may use other protocols, such as SIP, SIP-T, or H.323, for communicating with HLR 28. For example, the communications between VVLR 56 and HLR 28 may occur via media gateway controller 62, which may convert between the IS-41 protocol used by HLR 28 and the SIP or other protocol used by VVLR 56.

Once HLR 28 receives the routing information provided in step 304, HLR 28 may communicate with media gateway controller 62 to set up a media gateway, such as media gateway 60, that is able to route the call to the IP address obtained from VVLR 56. For example, HLR 28 may communicate with media gateway controller 62, using IS-41 signaling, as if media gateway controller 62 were an MSC. In particular, to set up the call HLR 28 may send media gateway controller 62 a message that includes the IP address from VVLR 56, as indicated by step 306. HLR 28 may also send media gateway controller 62 information regarding what vocoder formats are supported by multi-mode mobile station 16.

In response, media gateway controller 62 acts to set up the call through media gateway 60 to this IP address. Media gateway controller 62 may also identify an IMT trunk and port number that can be used for the call on the circuit-switched side of media gateway 60. Media gateway controller 62 may send the trunk and port number to HLR 28, as indicated by step 308. HLR 28 then sends the trunk and port number to MSC 24 in a locreq response message, as indicated by step 310. In response, MSC 24 forwards the call to media gateway 60 using the specified trunk and port number, as indicated by step 312.

To set up the call through packet-switched network 52 from media gateway 60, media gateway controller 62 may send call management service 58 a SIP INVITE message that invites a session with the IP address supplied by VVLR 56, as indicated by step 314. Acting as a SIP proxy server, call management service 58 forwards the SIP INVITE message to PBX 36, as indicated by step 316. In response, PBX 36 may alert multi-mode mobile station 16, as indicated by step 318. Multi-mode mobile station 16 then answers, as indicated by step 320.

PBX 36 then sends a 200 OK message to call management service 58, as indicated by step 322, and call management service 58 sends a 200 OK message to media gateway controller 62, as indicated by step 324. Media gateway controller 62 may then send media gateway 60 a MGCP CreateConnection message, as indicated by step 326. The CreateConnection message instructs media gateway 60 to create a connection between the trunk and port number used by MSC 24 and an RTP session with the IP address. Once media gateway 60 has created this connection, it responds with an acknowledgement, as indicated by step 328. Media gateway controller 62 then sends an acknowledgement to call management service 58, as indicated by step 330, and call management service 58 sends an acknowledgement to PBX 36, as indicated by step 332.

At this point, the call is established between the caller and multi-mode mobile station 16. The voice or other media exchanged between the caller and multi-mode mobile station 16 may be carried between MSC 24 and media gateway 60, via the intermachine trunk, in a PCM format, as indicated by step 334, and may be carried between media gateway 60 and mobile station 16, via packet-switched network 52, in an RTP format, as indicated by step 336.

Thus, the communication between VVLR 56 and HLR 28 help manage the mobility of multi-mobile station 16 between WWAN 12 and WLAN 14. As illustrated in FIGS. 3 and 4, when multi-mode mobile station 16 is being served by WLAN 14, multi-mode mobile station 16 can still be reached by dialing the same directory number (e.g., its MDN) that can be used to reach multi-mode mobile station 16 when it is being served by WWAN 12.

3. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for communication between a wireless wide area network (WWAN) and a wireless local area network (WLAN), said WWAN including a WWAN data register that contains a first data record for a multi-mode mobile station, said method comprising:
receiving, at a WLAN data register, a registration notification message comprising information regarding service registration for said multi-mode mobile station;
registering said multi-mode mobile station by storing a second data record regarding said multi-mode mobile station in said WLAN data register;
sending, from said WLAN data register, at least one registration notification configured to facilitate roaming of said multi-mode mobile station by indicating that said multi-mode mobile station is operating in a wireless coverage area of said WLAN;
receiving, at said WLAN data register, a routing request for said registered multi-mode mobile station; and
in response to said routing request, sending, from said WLAN data register, routing information to route a call to said registered multi-mode mobile station.

2. The method of claim 1, wherein said WLAN data register is communicatively coupled to a private branch exchange (PBX) located in said WLAN.

3. The method of claim 2, wherein said routing information includes a directory number associated with said PBX.

4. The method of claim 2, further comprising:
receiving, at said PBX, a call request for said call; and
responsive to said call request, alerting said registered multi-mode mobile station from said PBX.

5. The method of claim 1, wherein said routing information includes a directory number associated with a media gateway.

6. The method of claim 1, wherein said routing information includes an Internet Protocol (IP) address.

7. The method of claim 6, wherein said IP address is an IP address of said multi-mode mobile station.

8. The method of claim 6, wherein said IP address is an IP address of said WLAN data register.

9. The method of claim 6, wherein said IP address is an IP address of a private branch exchange (PBX).

10. The method of claim 1, wherein said routing information includes at least one parameter selected from the group consisting of a mobile identification number (MIN), a mobile directory number (MDN), a mobile station identification (MSID), and an electronic serial number (ESN).

11. The method of claim 1, wherein said routing information includes a host name or user name.

12. A method for communication between a wireless wide area network (WWAN) and a wireless local area network (WLAN), said WWAN including a WWAN data register that contains a first data record for a multi-mode mobile station, said method comprising:

receiving, at a WLAN data register, a registration notification message comprising information regarding service registration for said multi-mode mobile station;

storing a second data record regarding said multi-mode mobile station in said WLAN data register;

determining, at said WLAN data register, at least one WWAN parameter for said multi-mode mobile station; and transmitting, from said WLAN data register, at least one registration notification configured to facilitate roaming of said multi-mode mobile station by indicating that said multi-mode mobile station is operating in a wireless coverage area of said WLAN, wherein said registration notification includes said at least one WWAN parameter.

13. The method of claim 12, wherein said WLAN data register is communicatively coupled to a private branch exchange (PBX) located in said WLAN.

14. The method of claim 13, further comprising:

receiving a service registration message at said PBX, wherein said service registration message identifies said multi-mode mobile station; and said PBX responsively sending said registration notification message to said WLAN data register.

15. The method of claim 13, wherein determining, at said WLAN data register, said at least one WWAN parameter for said multi-mode mobile station comprises receiving, at said WLAN data register, said at least one WWAN parameter from said PBX.

16. The method of claim 12, wherein determining, at said WLAN data register, said at least one WWAN parameter for said multi-mode mobile station comprises receiving, at said WLAN data register, said at least one WWAN parameter from said multi-mode mobile station.

17. The method of claim 12, wherein determining, at said WLAN data register, said at least one WWAN parameter for said multi-mode mobile station comprises provisioning said at least one WWAN parameter at said WLAN data register.

18. The method of claim 12, wherein said at least one WWAN parameter is a parameter selected from the group consisting of a mobile identification number (MIN), a mobile directory number (MDN), a mobile station identification (MSID), and an electronic serial number (ESN).

19. The method of claim 12, wherein storing said second data record regarding said multi-mode mobile station comprises storing an address for said multi-mode mobile station.

20. The method of claim 12, wherein storing said second data record regarding said multi-mode mobile station comprises updating said second data record for said multi-mode mobile station.

* * * * *